suitable steel plates with openings including the shaft openings provided in the web elements 15 and 16. The web elements 15 and 16 are riveted together to form the end web constructions, at 13. The web elements 18 of the central web construction, at 14, are connected together by the bolts 34. The two end web constructions, at 13, and the central web construction, at 14, are then brought together in axial or superposed relation, the basal edges 21 and 22 of the web elements 16 and 18 being welded together, as shown at 35w. Thereafter, the apical flanges 17 are welded at 36w and 37w to the end webs 15 and the apical flanges 19 of the central web construction have their inner and outer margins welded together at 38w and 39w. Also the struts 23 are welded to the end and central web constructions, at 13 and 14, as already pointed out.

The assembled web construction, at 11, is then annealed, preferably at a temperature of 1000 degrees F., in order to relieve stresses due to fabrication, particularly, those due to the welding operations, this temperature being low enough not to affect desired physical properties of the steel. Next, the center is turned in order to true up the circumferential web edges, and the rims 10 are bored to slightly smaller diameter than the diameter of the web edges. The rims are heated just sufficiently to expand them so that they will pass over the web edges, it being possible to do this without heating the rims to such a temperature as to disturb their physical properties. After the rims are in place, they are welded, as shown at 42w, 43w, 44w, and 45w to the webs 15, 16, and 18; and, after welding, the assembled structure is subjected to a second stage of annealing, as before, preferably at 1000 degrees F., which is low enough not to affect the desired physical properties. Thereafter, the gear wheel is rough machined, material being left for finish machining, and the teeth are rough cut. Preferably, after these rough machining operations, the gear is subjected to a third stage of annealing at the same temperature as before, the second and third stages of annealing assuring that any stresses set up in the rim on account of welding, machining, or contraction against the web edges shall be relieved, while retaining desired physical properties. If there should be locked-up stresses in the rims relieved by rough cutting and causing distortion, or if stresses should be set on account of such cutting or machining, then the third step of annealing provides for relief of stresses prior to finish machining or cutting with the assurance of a stable final tooth form. It is to be understood, however, that the third stage of annealing may be omitted, as the second stage may be quite sufficient to relieve stresses set up on account of welding the rims to the webs; however, as a matter of precaution, I prefer to subject the structure to the third stage of annealing.

The bolts connecting the web elements 18 of the central web construction, at 14, are removed and the holes are reamed, so as to provide for drive fits of slightly larger bolts. Thereafter, the wheel structure is finished bored, the bolting faces of the end web constructions are finished, and such constructions are bolted to the flanges 26 and 27. The shaft 12 with the gear mounted thereon and connected thereto is now turned so that the tips of the gear teeth will all be in a cylindrical surface which is coaxial with the axis of the shaft 12 and the teeth are finished.

From the foregoing, it will be apparent that I have devised a gear of the marine reduction type which is strong and light. Strength with lightness is secured by forming the center or web construction from steel plate and by having the gear rims connected to the center or web construction in such a way that each rim is subjected to minimum deflection under load. As already pointed out, minimum deflection of a gear rim, which, of course, has uniformly distributed load imposed thereon, supported at two axially spaced points or regions, occurs when the distance between the supporting regions is equal approximately to the product of $$\sqrt{6}$$

times the overhang distance. With minimum deflection provided for in this way, it is obvious that minimum stiffness is required on the part of the rim for satisfactory operation, and, therefore, the weight of the rim may be reduced to a minimum. Aside from the advantageous features of strength and lightness following from the fabricated type of center or web construction, on account of the manufacture of the latter from steel plate, the material is more dependable and its physical properties are more uniform.

Also, the web elements of the center or web construction are of such design and are so disposed relatively, that maximum stiffness and strength are secured. Furthermore, I have devised a novel method involving the fabrication and assembly of the gear parts and steps of annealing, including annealing of the gear rims to remove stresses and to assure minimum distortion of finished gear teeth.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In a gear, a pair of toothed rims and

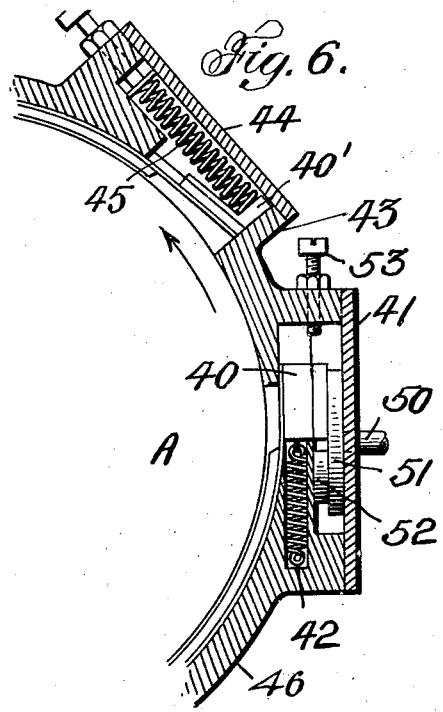
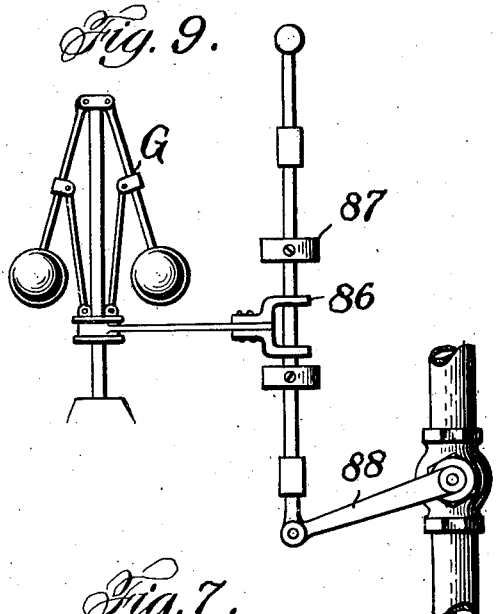
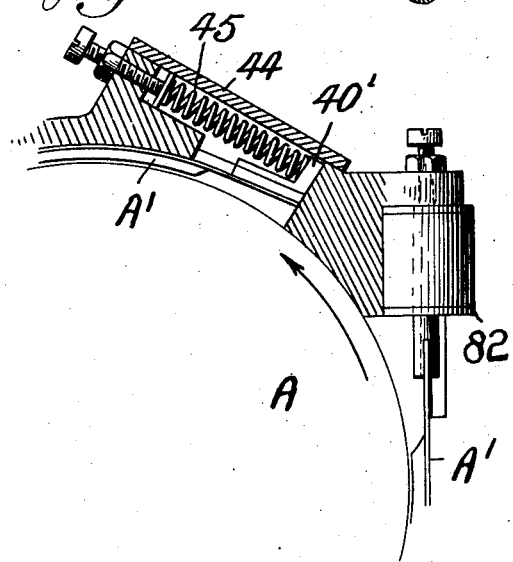
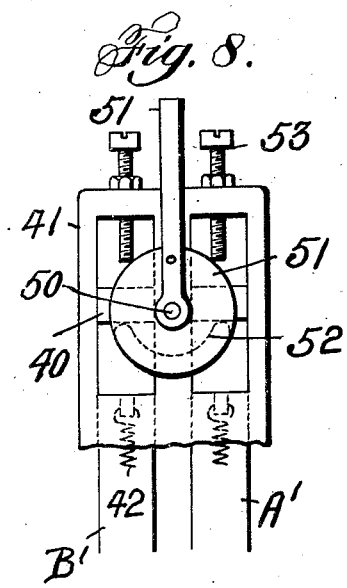

Patented Aug. 30, 1932

1,874,714

UNITED STATES PATENT OFFICE

ELMER A. SPERRY AND WALTER M. PERRY, OF BROOKLYN, NEW YORK, ASSIGNORS TO SPERRY DEVELOPMENT COMPANY, OF DOVER, DELAWARE, A CORPORATION OF DELAWARE

VARIABLE PITCH PROPELLER

Application filed June 26, 1930. Serial No. 463,893.

This invention relates to improvements in the Sperry type of variable pitch propeller which employs two brake drums, one or the other of which is designed to be held when it is desired to change the pitch of the blades in one direction or the other. It is one of the principal objects of our invention to provide a better control of the rate of change of pitch than has heretofore been possible. For this purpose we provide a novel type of governor designed to supply additional resistance to be overcome by the operator in effecting change of pitch.

It is a further object of our invention to provide in a construction such as outlined above, that is, one in which brake drums and brake bands are employed, means which will prevent the locking of the brake bands to the brake drums so as to stop the brake drums completely from rotating and thus preventing too rapid operation of the variable pitch mechanism.

It is a further object of our invention to provide means for effecting a positive but quiet stopping of the blades in the positions of extreme pitch.

Still another object of our invention is the provision of means for automatically effecting change of pitch of the propeller blades in response to the speed of the engine.

Another object of our invention is the provision of means for automatically throttling the engine in case of racing thereof due to improper setting of the pitch of the propellers.

Still other objects and advantages of our invention will become apparent in the following detailed description thereof.

In the accompanying drawings,

Fig. 1 is a vertical section taken substantially on line 1—1 of Fig. 2 through a propeller hub and engine shaft showing our invention applied thereto.

Fig. 2 is a front view of a portion of the mechanism disclosed in Fig. 1.

Fig. 3 is an elevation, partly sectioned, of the governor mechanism employed in Figs. 1 and 2.

Fig. 4 is a horizontal section through the governor mechanism of Fig. 3.

Fig. 5 is a view largely diagrammatic of a governor-controlled mechanism for automatically operating the brake bands.

Fig. 6 is a vertical section through the brake drum, brake band, and supporting casing for the brake band.

Fig. 7 is a view similar to Fig. 6 showing the automatic control of the brake mechanism shown diagrammatically in Fig. 5.

Fig. 8 is a vertical section through the brake band applying mechanism shown in Figs. 6 and 7.

Fig. 9 is a view of a governor-controlled engine throttle for limiting the upper speed of said engine.

Referring to Fig. 1 of the drawings, there is disclosed a hub 10 comprising two steel forgings 11—12 locked together by bolts 13 and clamps 14. Said hub includes a plurality of sockets 15 within which are supported and journaled sleeves 16 in which is adapted to be fastened the propeller blades 17. Said blades are preferably made of duralumin and screw-threaded into the base of the sleeves 16 where they are locked in position by screws 18. When not running, the said sleeves and their propellers rest upon supports 20 in the base of the hub. When running, however, the sleeves 16 are supported upon thrust bearings 21. Said thrust bearings take the entire load when the centrifugal force is sufficiently great, but at intermediate speeds there is a bending moment of the blade which is taken up by radial bearings 22 and bearing surfaces 23 between the socket 15 and the sleeve 16.

Each sleeve 16 carries adjacent its base a gear quadrant 25. A single annular adjusting gear 26 meshes with all of said quadrants so that all of the blades may be simultaneously turned in one direction or the other to vary the pitch of the propeller blades when the adjusting gear 26 is rotated. To insure the proper meshing of adjusting gear 26 with the gear quadrants 25 so that there is no greater amount of slack between gear 25 and one of the gear quadrants 26 than between said adjusting gear and any other gear quadrant, there is provided a sleeve 27 in engagement with bearings 28 on which adjusting gear 26 is supported, and screws 29 extending through the main hub casing 10 into engagement with said sleeve for varying the degree of mesh of adjusting gear 26 with gear quadrants 25.

For operating the adjusting gear 26 in one direction or the other to vary the pitch of all of the propeller blades simultaneously in one direction or the other there is provided the following mechanism: The adjusting gear 26 may be rotated by means of a pinion 32 meshing therewith, the said pinion being carried on the end of a shaft 33 journaled in the main hub casing and having keyed thereto a worm gear 34. Said worm gear 34 meshes with a worm 35 on the same shaft as a bevel gear 36 in engagement with two gears 37 and 38 fixed to brake drums A and B respectively. Said brake drums are frictionally mounted on the main propeller casing 10 so that normally they rotate with the propeller hub. During such normal operation, the propeller hub, brake drums A and B, gears 37, 38, 36, 35, 34, 32, 26 and 25 all move together as a unit. It will be seen, however, that as soon as either brake band A or B is retarded with respect to the propeller hub, gear 36 will be rotated because of its engagement with gears 37 and 38, one of which is now retarded with respect to gear 36, so that the latter gear is rotated on its axis and hence rotates the other brake drum ahead of the hub at a corresponding rate. The rotation of worm gear 36 on its axis will, of course, rotate worm 35, worm gear 34, and pinion 32 to rotate the adjusting gear 25, and hence rotate the propeller blades to vary the pitch. The direction of adjustment of the pitch depends, of course, upon which brake drum is retarded.

For selectively retarding the brake drums, we have provided brake bands A'—B' which encircle the cylindrical brake drums A and B respectively. Each band may be formed as disclosed in Figs. 6 to 8 inclusive wherein one end thereof is attached to a steel block 40 which is slidable within a casing 41 and normally pulled by a spring 42 in a direction to spread the brake band and disengage it from the respective drum. The other end of the brake band likewise is fixed to a block 40' which is held against one end 43 of a casing 44 by means of a spring 45. When it is desired to cause engagement of either brake band with its respective brake drum, the operator turns a shaft 50 by means of a suitable connection to lever 51 which swings a cam member 52 to lift the block 40 against the action of the spring 42 and thus wrap the band around the drum. Adjustable stops 53 may be provided to limit the degree of actuation of blocks 40 by the cam 52. This degree of movement will always be less than the degree of movement of blocks 40' on the other ends of the bands. By the construction hereinbefore described, it is impossible, regardless of the amount of force that is applied to the shaft 50 and the brake band A' or B' to lock the brake band so effectively against movement as to result in complete stoppage of the drum and hence a very rapid rotation of gear 36 and an abnormal, and perhaps dangerously rapid, adjustment of the pitch of the propeller blades. This is apparent because as soon as the pull of the brake drum on the brake band becomes great enough, the end of the brake band carrying block 40' will be dragged by the brake drum in such direction as to compress spring 45 and thus release the grip of the band on the drum to an extent sufficient to prevent complete locking.

It will be observed that the casing 46 enclosing the brake bands is concentric with the drums. This permits the maintenance of a very small clearance between the brake bands and the brake drums, because it provides an even support for the band throughout its entire circumference. Heretofore the band had to be supported by means, such as spring supports, attached to the band at various points, which resulted in certain parts of the band lying closer to the drum than other parts with consequent uneven engagement and wearing. This condition also necessitated the maintenance of a substantial gap between the brake bands and the brake drum. It will further be observed that the brake bands are each provided with a steel back which insures uniform positioning of the band with respect to the drum so there can be no uneven touching of the band against the drum, and also permits the whole band to be moved toward or away from the drum by a single force applied to one end of the band, as for instance, in this case a single spring in connection with one point of support.

Since the speed of the engine is usually over a thousand R. P. M., and since it requires but a small amount of force on the brake band to lock the brake drum, a rapid setting of the propeller blade pitch is effected which is substantially beyond the control of the operator, since the limit of applied force is so small that no appreciable control thereof is possible. We obtain a very effective control of the speed of adjustment of the propeller blade pitch by the use of a novel form of governor which is designed to add materially to the amount of resistance to be overcome by the operator. We further provide such a governor which has a braking effect that varies with the square of its R. P. M. so that a very considerable difference in braking power results between low and high speeds. This variable braking power makes it possible to get a fine adjustment by applying the main brake lightly, while a very much larger force will have to be applied in order to get rapid rotation of the blades, such as is necessary when completely reversing. This form of governor is illustrated in Figs. 2, 3 and 4, and comprises a bevel gear 60 which may mesh with either one of the gears 37 or 38, since as hereinbefore explained the retardation of any one brake drum to which these gears are fixed results in a corresponding increase in speed of the other gear in the opposite direction. Thus, whenever one or the other of the brake bands is retarded and there is movement in one direction or the other of gear 36, there will also be rotation of bevel gear 60 which is mounted on a shaft 61 carrying governor weights 62 on laterally extending pins 63 fixed to the shaft 61. Thus when the weights are thrown outwardly they will drag with them the two members 64 of a brake member pivotally connected together at 65 and having their open ends connected by a latch comprising a pin 66 operable in a slot within a catch 67 to limit the amount of spread of said brake members 64. Direction of rotation of shaft 61 determines the direction of rotation of the brake members 64 into engagement with one or the other of stops 68—69. The resistance thus offered by the governor brake is added to the gearing and blade bearing resistance to be overcome by the operator. It will be seen also that although the force that is applied to the brake drums A or B is multiplied by the gearing between gears 37—38 and gears 25—26, the retarding force of the governor brake does not return through this gearing and, therefore, does not have its force reduced. Instead, it is applied directly to gear 37 or 38 and at the same working distance as the force applied to the beginning of the multiplying gearing by the brake band.

We provide suitable means for effecting a quiet and positive stop for limiting the degree of adjustment of the propeller blade pitch. For this purpose we may utilize the governor just described which carries the cam surfaces 70—71 into the path of one or the other of rollers 72—73 movable with the adjusting gear 25. As the gear 60 of the governor begins to rotate, it will carry the pivot portion 65 of the governor into engagement with one or the other of stops 68—69, depending on direction of rotation, to limit the movement thereof. This movement is sufficient to bring into the path of said rollers 72 or 73 the proper cam 70 or 71 with which said rollers contact to limit the movement of the adjusting gear by greatly increasing the pressure of the governor brake band against the weights. If desired a resilient arm 74 may be incorporated in the support for roller 73 or 72 to provide a resilient stop mechanism. When the direction of adjustment is reversed, the pivot portion 65 moves away from its stop and the roller 72 or 73 rides down toward the narrow end of the cam 70 or 71 so as to free the governor quickly from the force applied by said rollers.

Since it is the function of the variable pitch adjusting mechanism to vary the pitch to give the proper speed of the engine, automatic means may be provided, operated from the engine, whereby the pitch will be controlled automatically from the engine proper so that when the engine speed increases above normal the propeller pitch will be increased, while when the engine speed falls off, the propeller pitch will be decreased. For this purpose there may be provided a governor G designed to make upper and lower contacts 80—81 to control electro-magnets 82—83, the cores 84—85 of which may be connected to the ends of brake bands A′—B′ respectively, so that as the speed of the engine rises and falls the proper brake band A′ or B′ will be applied to give the proper setting of the propeller blade pitch.

It may happen that when an operator sets a low pitch of the propeller that he may forget to increase the propeller pitch as the aircraft ascends, the lighter air of which will cause undue racing of the engine. We may provide an automatic safeguard controlled from the engine in the form of governor G so that when the speed of the engine increases to a sufficient extent the member 86 will engage a member 87 on a link which controls the engine throttle 88 to throttle the engine down under such conditions.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a variable pitch propeller mechanism, a plurality of blades, means for simultaneously varying the pitch of said blades including rotating brake drums and brake bands cooperating therewith, a casing enclosing said drum and bands, means supported by said casing and engaging one end of each band whereby the band may be operated to engage the respective drum, and a resilient connection between the other end of each band and said casing.

2. In a variable pitch propeller mechanism, a plurality of blades, means for simultaneously varying the pitch of said blades including rotating brake drums and brake bands cooperating therewith, gearing actuated by said brake mechanism, and means for increasing the resistance to be overcome by said gearing, said last-named means including a governor comprising a brake band and a pair of weights driven from said gearing and cooperating with said last-named band.

3. In a variable pitch propeller mechanism, a plurality of blades, means for simultaneously varying the pitch of said blades including rotating brake drums and brake bands cooperating therewith, gearing actuated by said brake mechanism, and means for increasing the resistance to be overcome by said gearing, said last-named means including a governor comprising a brake band, a shaft driven from said gearing, pins fixed on said shaft, and weights slidable on said pins and cooperating with said last-named band.

4. In a variable pitch propeller mechanism, a plurality of blades, means for simultaneously varying the pitch of said blades including rotating brake drums and brake bands cooperating therewith, gearing actuated by said brake mechanism, and means for increasing the resistance to be overcome by said gearing, said last-named means including a governor comprising a split brake band composed of relatively movable members, means for limiting the spread of said members, and a pair of weights driven from said gearing and cooperating with said members.

5. In a variable pitch propeller mechanism, a plurality of blades, means for simultaneously varying the pitch of said blades, means for opposing said pitch varying means, and means rendered effective as the blades approach their limiting positions for increasing the resistance offered by said opposing means.

6. In a variable pitch propeller mechanism, a plurality of blades, means for simultaneously varying the pitch of said blades, a governor brake actuated by said pitch varying means, and means rendered effective as the blades approach their limiting positions for increasing the resistance of said brake.

7. In a variable pitch propeller mechanism, a plurality of blades, means for simultaneously varying the pitch of said blades, a governor brake including a brake band and rotatable weights operated by said pitch varying means, and means connected to said pitch varying means and adapted to engage said band as the blades reach their limiting positions for increasing the resistance of said brake.

8. In a variable pitch propeller mechanism, a plurality of blades, means for simultaneously varying the pitch of said blades, said means including an actuating gear, a governor brake including a brake band and rotatable weights operated by said pitch varying means, and means actuated by said gear and adapted to engage said band as the blades reach their limiting positions for increasing the resistance of said brake.

9. In a variable pitch propeller mechanism, a plurality of blades, means for simultaneously varying the pitch of said blades, said means including an actuating gear, a governor brake including a brake band and rotatable weights operated by said pitch varying means, and resilient means carried by said gear and adapted to engage said band as the blades reach their limiting positions for increasing the resistance of said brake.

10. In a variable pitch propeller mechanism, a plurality of blades, means including multiplying gearing for simultaneously varying the pitch of said blade, a governor brake operated by said means at substantially the same effective working distance as said gearing is operated by said means, and means adapted to be rendered effective when the blades approach their limiting positions for increasing the resistance of said brake.

11. In a variable pitch propeller mechanism, a plurality of blades, means including multiplying gearing for simultaneously varying the pitch of said blade, a governor brake operated by said means at substantially the same effective working distance as said gearing is operated by said means, and means carried by said gearing and adapted to engage said brake when the blades approach their limiting positions for applying a multiplied force to said brake to increase the resistance thereof.

12. In a variable pitch propeller mechanism, a plurality of blades, means for simultaneously varying the pitch of said blades, a governor brake including a brake band and rotatable weights operated by said means, said band being mounted for oscillation between predetermined limits, cam members carried by said band, and members adapted to be actuated by said pitch varying means into engagement with the respective cam when the blades approach their limiting position for increasing the resistance of said brake, said members moving toward the low end of the respective cam when said pitch varying means is reversed.

13. In a variable pitch propeller mechanism, a plurality of blades, means including multiplying gearing for simultaneously varying the pitch of said blades, a governor brake including a brake band and rotatable weights operated by said means, said band being mounted for oscillation between said predetermined limits, cams carried by said band and members adapted to be actuated by said gearing into engagement with the respective cam when the blades approach their limiting positions for applying a multiplied force to said band and increasing the resistance of said brake, said members moving toward the low end of the respective cam when said pitch varying means is reduced.

14. In combination, a craft having an engine, a variable pitch propeller, means for varying the pitch of the propeller blades, said means including a pair of drums and brake bands cooperating with said drums, and means controlled by the speed of said engine for selectively actuating said bands into engagement with said drum.

15. In a variable pitch propeller mechanism, a brake drum, a brake band surrounding said drum, a casing enclosing said band and concentric with said drum, and means for spreading said band to ineffective position into complete peripheral contact with said casing.

16. In a variable pitch propeller mechanism, a brake drum, a brake band surrounding said drum, a metallic back fixed to said band, a casing enclosing said band and concentric with said drum, and means acting upon one end of said band for actuating the same to effective position in engagement with said drum and to ineffective position into complete peripheral contact with said casing.

In testimony whereof we have affixed our signatures.

ELMER A. SPERRY.
WALTER M. PERRY.